US008072935B2

(12) United States Patent
Kubota

(10) Patent No.: US 8,072,935 B2
(45) Date of Patent: Dec. 6, 2011

(54) MOBILE COMMUNICATION SYSTEM, HANDOVER CONTROL METHOD, BASE STATION, AND MOBILE STATION

(75) Inventor: Mitsuhiro Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 1102 days.

(21) Appl. No.: 11/822,990

(22) Filed: Jul. 11, 2007

(65) Prior Publication Data

US 2008/0014946 A1 Jan. 17, 2008

(30) Foreign Application Priority Data

Jul. 12, 2006 (JP) .................. 2006/191022

(51) Int. Cl.
*H04W 4/00* (2009.01)
*H04W 36/00* (2009.01)
(52) U.S. Cl. ...................... 370/331; 455/436
(58) Field of Classification Search .......... None
See application file for complete search history.

(56) References Cited

U.S. PATENT DOCUMENTS

| 2006/0116118 A1* | 6/2006 | Charriere et al. | 455/423 |
| 2006/0146749 A1* | 7/2006 | Lundh et al. | 370/331 |

FOREIGN PATENT DOCUMENTS

| JP | 07-046644 | 2/1995 |
| JP | 2006-174273 | 6/2006 |
| WO | WO2004/030396 A1 | 4/2004 |
| WO | WO 2006/071174 A1 | 7/2006 |
| WO | WO2006/071174 A1 | 7/2006 |

OTHER PUBLICATIONS

Japanese Office Action dated Apr. 26, 2011 (with partial English translation).
European Search Report dated Nov. 5, 2007.
"Evolved Universal Terrestrial Radio Access (E-UTRA) and Evolved Universal Terrestrial Radio Access Network (E-TRAN); Radio interface protocol aspects (Release 7) (3GPP TR 25.813) Technical Report" 3GPP, No. RP-060390, Jun. 2006, pp. 1-39, XP002455820.
"Technical Specification Group Radio Access Network; Feasibility Study for Evolved UTRA and UTRAN (Release 7) 3GPP TR 25.912 v0.2.0" 3GPP, [Online] No. v020, Jun. 2006, pp. 1-57, XP002455821.
"3rd Generation Partnership Project; Technical Specification Group Radio Access Network; Evolved Universal Terrestrial Radio Access (E-UTRA) and Evolved UniversalTerrestrial Radio Access Network (E-UTRAN); Radio interface protocol aspects (Release 7)", Technical Report, 3GPP TR 25.813, Jun. 2006.

* cited by examiner

*Primary Examiner* — Erika Gary
(74) *Attorney, Agent, or Firm* — McGinn IP Law Group, PLLC

(57) ABSTRACT

A mobile communication system according to an exemplary aspect of the invention is a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the handover destination base station starts transmission of the data to the mobile station using a shared channel in response to the completion of the handover of the mobile station.

18 Claims, 5 Drawing Sheets

MOBILE COMMUNICATION SYSTEM, HANDOVER CONTROL METHOD, BASE STATION, AND MOBILE STATION

This application is based upon and claims the benefit of priority from Japanese patent application No. 2006-191022, filed on Jul. 12, 2006, the disclosure of which is incorporated herein in its entirety by reference.

BACKGROUND OF THE INVENTION

1. Field of the Invention

The present invention relates to a mobile communication system, a handover control method, a base station, and a mobile station. More particularly, the present invention relates to a mobile communication system in which data transmission is performed from a base station to a mobile station using a shared channel.

2. Related Art

In a mobile communication system in which data is transmitted from a radio base station as an Enhanced NodeB (eNodeB) to a mobile terminal as User Equipment (UE) using a shared channel, for making a handover, the mobile terminal measures received signal levels for adjacent cells, and a radio base station which will be the source (or the origin of a handover) determines whether or not to carry out a handover based on the received signal levels of the adjacent cells as measured by the mobile terminal, and decides a radio base station which will be the destination (or the destination of a handover) (see 3GPP TR 25.813 V7.0.0 (2006-06) 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release7), 9.1.5 Handover).

Then, the source radio base station makes a handover request to the destination radio base station, and instructs the mobile terminal to undergo a handover to the destination radio base station. Also, the source radio base station starts transfer of user data sent from a core network, which is a Mobility Management Entity (MME)/User Plane Entity (UPE), to the destination radio base station.

In response to the instruction for a handover, the mobile terminal establishes synchronization with the destination radio base station and transmits a handover confirmation response to the destination radio base station, thereby completing the handover procedure. The destination radio base station notifies the source radio base station of completion of the handover procedure, and also provides the core network with location information for the mobile terminal so that the core network can directly transmit user data to the destination radio base station.

Instead of the source radio base station transferring user data to the destination radio base station at the time of a handover, it is also possible that the core network transmits user data to both the source and destination radio base stations by arranging the core network to transmit user data to any radio base station that manages a cell a pilot signal from which is received on the mobile terminal with a reception quality equal to or above a certain threshold value.

In a shared channel transmission scheme, a hard handover is conducted because it is difficult to establish temporal synchronization among cells due to the fact that packet scheduling is performed at radio base stations. Accordingly, there can be concerns such as occurrence of data loss and associated reduction in a data transmission rate. In addition, as stated above, since a radio base station decides whether to carry out a handover or not after receiving a measurement report from a mobile terminal as a procedural step of a handover, switching of radio channels takes time.

Services currently under consideration that can be provided using a shared channel include non-real-time services for data transfer, viewing of web information and the like. In such a case, when packet loss has occurred in the course of a handover, packet retransmission is carried out at a higher layer to ensure that the mobile terminal receives data. However, when a real-time service for which occurrence of delay can significantly affect QoS (Quality of Service) is provided, such as VoIP (Voice over IP) and streaming, or when high QoS is required even for a non-real-time service, retransmission control at a higher layer is not effective and delay in received data significantly affects quality of service. To realize the provision of such services on a shared channel, there is a need for a handover scheme that does not cause data loss and significant delay.

BRIEF SUMMARY OF THE INVENTION

An exemplary object of the invention is to provide a mobile communication system, a handover control method, a base station, and a mobile station that can prevent occurrence of data loss during a handover using a shared channel.

A mobile communication system according to an exemplary aspect of the invention is a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the handover destination base station starts transmission of the data to the mobile station using a shared channel in response to the completion of the handover of the mobile station.

A mobile communication system according to an exemplary aspect of the invention is a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein, during the handover of the mobile station, the handover source base station alternately sets an interruption period in which transmission of the data to the mobile station using a shared channel is interrupted and a period in which the transmission is performed, and the handover destination base station performs transmission of the data to the mobile station using a shared channel in the interruption period during the handover of the mobile station.

A handover control method according to an exemplary aspect of the invention is a handover control method for a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the method including: starting transmission of the data from the handover destination base station to the mobile station using a shared channel in response to the completion of the handover of the mobile station.

A handover control method according to an exemplary aspect of the invention is a handover control method for a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the method including: during the handover of the mobile terminal, alternately setting an interruption period in which transmission of the data from the handover source base station to the mobile station using a shared channel is interrupted and a period in which the transmission is performed; and performing transmission of the data from the handover destination base station to the mobile station using a shared channel in the interruption period during the handover of the mobile station.

A base station according to an exemplary aspect of the invention is a base station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the base station starts transmission of the data to the mobile station using a shared channel in response to the completion of the handover of the mobile station to the base station.

A base station according to an exemplary aspect of the invention is a base station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the base station alternately sets an interruption period in which transmission of the data to the mobile station using a shared channel is interrupted and a period in which the transmission is performed during the handover of the mobile station from the base station to another base station, and the base station performs, during the handover of the mobile station to the base station, transmission of the data to the mobile station using a shared channel in the interruption period set in another base station.

A recording medium according to an exemplary aspect of the invention is a recording medium having recorded thereon a program for causing a computer to execute an operation control method for a base station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the program includes processing of starting transmission of the data to the mobile station using a shared channel in response to the completion of the handover of the mobile station to the base station.

A recording medium according to an exemplary aspect of the invention is a recording medium having recorded thereon a program for causing a computer to execute an operation control method for a base station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the program includes processing of, during the handover of the mobile station from the base station to another base station, alternately setting an interruption period in which transmission of the data to the mobile station using a shared channel is interrupted and a period in which the transmission is performed; and processing of, during the handover of the mobile station from another base station to the base station, performing transmission of the data to the mobile station using a shared channel in the interruption period set in the other base station.

A mobile station according to an exemplary aspect of the invention is a mobile station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the mobile station receives the data which starts to be transmitted from the handover destination base station using a shared channel in response to the completion of the handover of the mobile station.

A mobile station according to an exemplary aspect of the invention is a mobile station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the mobile station receives, during the handover thereof, the data from the handover source base station which alternately sets an interruption period in which transmission of the data to the mobile station using a shared channel is interrupted and a transmission period in which the transmission is performed, in the transmission period, and receives, during the handover thereof, in the interruption period the data from the handover destination base station that performs transmission of the data to the mobile station using a shared channel in the interruption period.

A recording medium according to an exemplary aspect of the invention is a recording medium having recorded thereon a program for causing a computer to execute an operation control method for a mobile station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the program includes processing of receiving the data which starts to be transmitted from the handover destination base station using a shared channel in response to the completion of the handover of the mobile station.

A recording medium according to an exemplary aspect of the invention is a recording medium having recorded thereon a program for causing a computer to execute an operation control method for a mobile station in a mobile communication system that includes a mobile station, base stations, and a core network that transmits data destined for the mobile station to at least both a handover source base station and a handover destination base station among the base stations at the time of the handover of the mobile station, the handover source base station transmitting the data to the mobile station using a shared channel, wherein the program includes processing of receiving, during the handover of the mobile station, the data from the handover source base station which alternately sets an interruption period in which transmission of the data to the mobile station using a shared channel is interrupted and a transmission period in which the transmission is performed, in the transmission period; and receiving, during the handover of the mobile station, in the interruption period the data from the handover destination base station that performs transmission of the data to the mobile station using a shared channel in the interruption period.

DETAILED DESCRIPTION OF EXEMPLARY EMBODIMENTS

Exemplary embodiments of the invention will be described below with reference to drawings.

Figure 1:
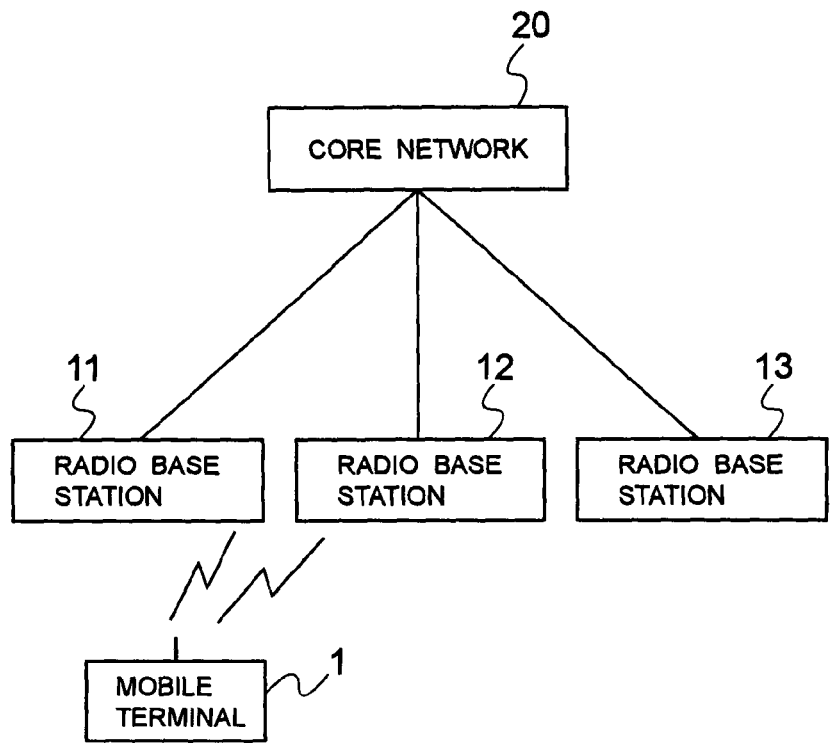
FIG. 1 shows a configuration of a mobile communication system using a shared channel transmission scheme according to a first exemplary embodiment of the invention.

FIG. 1 shows a configuration of a mobile communication system using a shared channel transmission scheme according to a first exemplary embodiment of the invention. In FIG. 1, the mobile communication system according to the first embodiment of the invention includes a mobile terminal 1, radio base stations 11 to 13, and a core network 20.

The mobile terminal 1 supports a shared channel transmission scheme and can access the radio base stations 11 to 13. The radio base stations 11 to 13 support the shared channel transmission scheme, and are each linked to the core network 20 by wired connection. The core network 20 is an exchange that performs call control, and is connected to other exchanges and/or external networks not shown.

Figure 2:
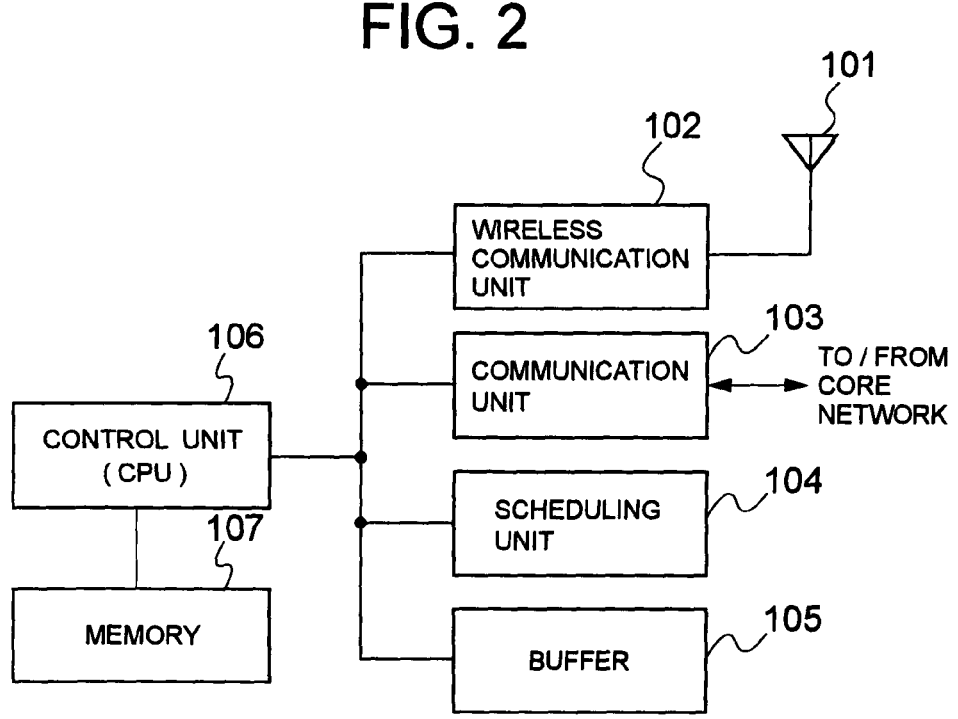
FIG. 2 shows a configuration of a radio base station in FIG. 1.

FIG. 2 shows the configuration of each of the radio base stations 11 to 13 shown in FIG. 1. In FIG. 2, each of the radio base stations 11 to 13 includes an antenna 101 and a wireless communication unit 102 for data transmission and reception to and from the mobile terminal 1, a communication unit 103 for data transmission and reception to and from the core network 20, a scheduling unit 104 which performs scheduling for deciding the order of priority in data transmission using a shared channel, a buffer 105 for temporarily saving user data destined for the mobile terminal 1 which is received from the core network 20, a memory 107 in which programs are stored, and a control unit (CPU) 106 which controls the components described above in accordance with the programs in the memory 107.

The configuration of the first exemplary embodiment has been described above. As the configurations of the mobile terminal 1 and the core network 20 of FIG. 1 are well-known to those skilled in the art, detailed description of their configuration is omitted.

Figure 3:
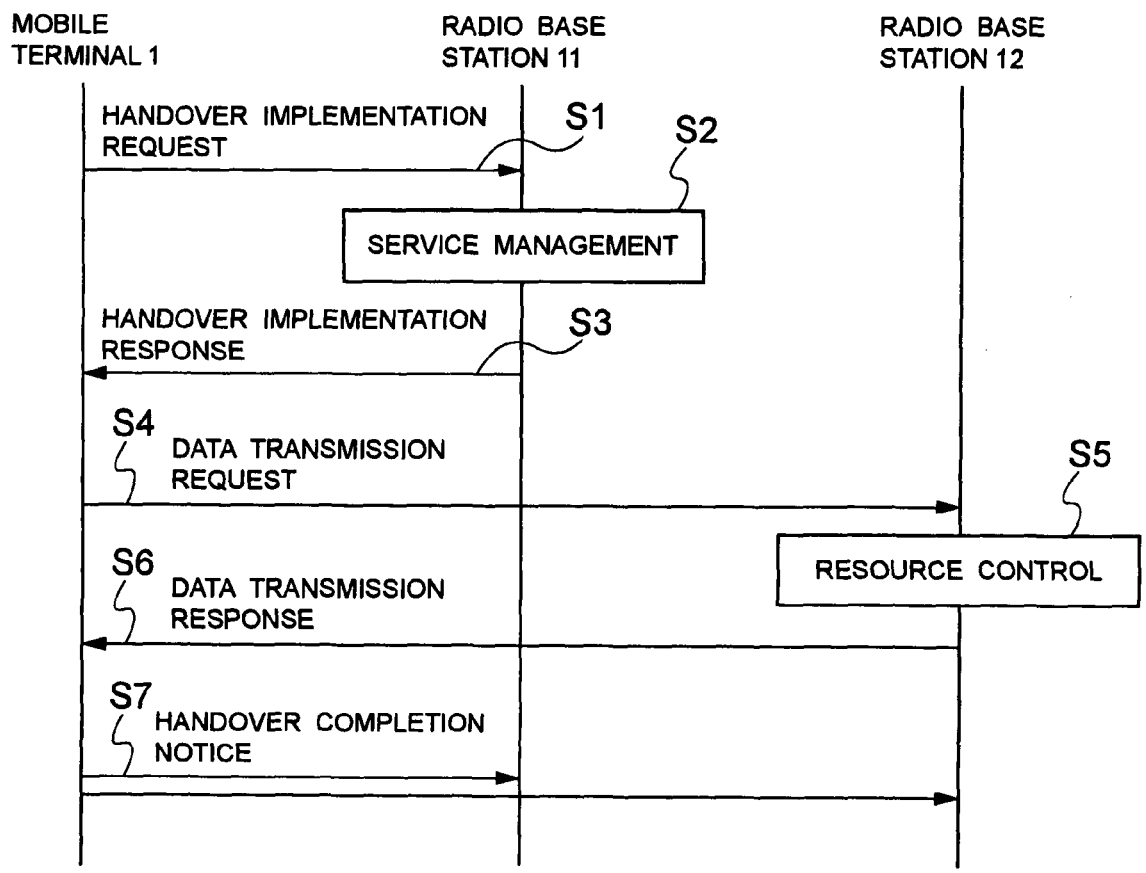
FIG. 3 is a sequence diagram showing the operation in the mobile communication system of FIG. 1 during a handover.
Figure 5A:
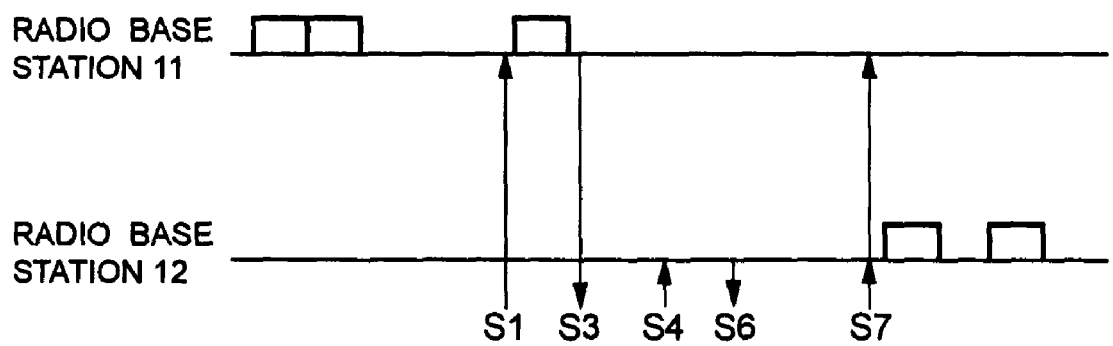
FIG. 5 shows the user data transmission operation of radio base stations of FIG. 1 during a handover.

Next, the operation of the mobile communication system according to the first exemplary embodiment of the invention will be described with reference to drawings. FIG. 3 is a sequence diagram showing the operation of the mobile communication system of FIG. 1 at the time of a handover, and FIG. 5A is a diagram showing the user data transmission operation at the radio base stations of FIG. 1 at the time of a handover.

It is assumed that the mobile terminal 1 is moving from a cell covered by the radio base station 11 toward a cell covered by the radio base station 12, and is in communication with the radio base station 11 by a shred channel transmission scheme. The mobile terminal 1 includes the functions to receive pilot signals transmitted from adjacent cells and measure the quality of their reception, and report the quality to the core network 20 via the radio base station 11 together with information identifying the cells. The core network 20 transmits user data destined for the mobile terminal 1 to any radio base station that manages a cell the pilot signal from which is received with a reception quality equal to or above a certain threshold value on the mobile terminal 1; consequently, data transmission is being performed from the core network 20 to both the radio base stations 11 and 12. However, transmission of user data within a wireless section is being performed only by the radio base station 11, which is the origin of movement.

In this situation, the mobile terminal 1 receives a pilot signal transmitted in each cell, decides a destination cell based on the magnitude of propagation loss of the signal, and makes a handover implementation request to the source radio base station 11 (step S1). The mobile terminal 1 may decide a destination cell based on the reception quality of the pilot signal (e.g., Block Error Rate (BLER)).

At the source radio base station 11, in response to the handover implementation request from the mobile terminal 1, the scheduling unit 104 performs scheduling so as to interrupt the transmission of user data to the mobile terminal 1 using a shared channel (step S2), and the control unit 106 transmits a handover implementation response to the mobile terminal 1 via the antenna 101 and the wireless communication unit 102 (step S3). As a result, as shown in FIG. 5A, user data transmission using a shared channel from the source radio base station 11 to the mobile terminal 1 is interrupted in accordance with the scheduling result from the scheduling unit 104.

The mobile terminal 1 transmits a data transmission request directly to the radio base station 12 that manages the destination cell (step S4). Here, a cell identification number is included in the data transmission request for specifying the requested destination of data transmission. Upon reception of the data transmission request, the control unit 106 of the destination radio base station 12 checks available radio resources and determines whether the base station 12 can accommodate the mobile terminal 1 (step S5). If the mobile terminal 1 can be accommodated, the control unit 106 starts to accumulate user data destined for the mobile terminal 1 which is received from the core network 20 in the buffer 105, and transmits to the mobile terminal 1 a data transmission response indicating that the mobile terminal 1 can be accommodated (step S6).

After receiving the data transmission response, the mobile terminal 1 receives a control signal necessary for a handover from the destination radio base station 12 to complete the handover, and then transmits a handover completion notice to the source and destination radio base stations 11 and 12 (step S7). As shown in FIG. 5A, upon receipt of the notice, the source radio base station 11 terminates user data transmission to the mobile terminal 1 that uses a shared channel. On the other hand, at the destination radio base station 12, the scheduling unit 104 decides the order of transmitting user data using a shared channel to the mobile terminal 1, and the control unit 106 starts transmission of user data destined for the mobile terminal 1 which is accumulated in the buffer 105 in accordance with the scheduling result.

Since user data transmission to the mobile terminal 1 using a shared channel is performed in accordance with the scheduling by the scheduling unit 104, the data transmission may not be performed immediately after the destination radio base station 12 receives the handover completion notice. As shown in FIG. 5A, during steps S3 to S7, data transmission to the mobile terminal 1 is not performed and thus the transmission rate can decrease. Therefore, the scheduling unit 104 checks the amount of data accumulated in the buffer 105, and if the amount of accumulated user data destined for the mobile terminal 1 exceeds a certain value, it performs scheduling giving higher priority to data transmission to the mobile terminal 1 using a shared channel than to that to other mobile terminals, and conducts data transmission to the mobile terminal 1 by using a number of successive transmission slots on the shared channel. This can prevent decrease in the data transmission rate.

Here, in a case where the modulation scheme is changed in accordance with the reception condition on the mobile terminal 1, the scheduling unit 104 may also decide the number of transmission slots that will be successively used in consideration of the reception condition on the mobile terminal 1. The QoS required by the mobile terminal 1 may be stored in the memory 107, and the scheduling unit 104 may give higher priority to data transmission to the mobile terminal 1 than that to other mobile terminals when those conditions are met that high QoS is required and the amount of data accumulated in the buffer 105 exceeds a certain value.

Figure 4:
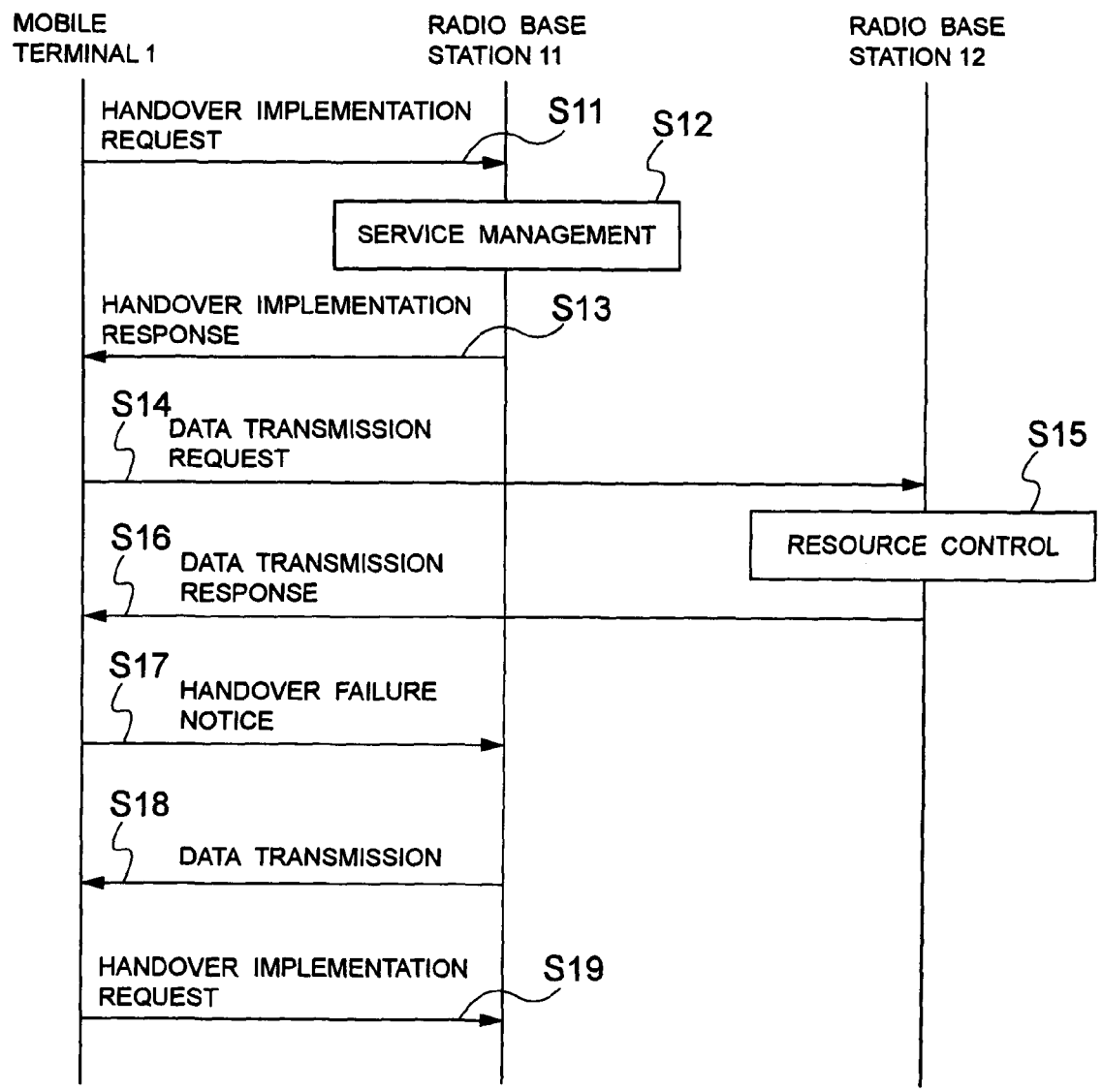
FIG. 4 is a sequence diagram showing the operation performed when a handover fails in the mobile communication system of FIG. 1.
Figure 5B:
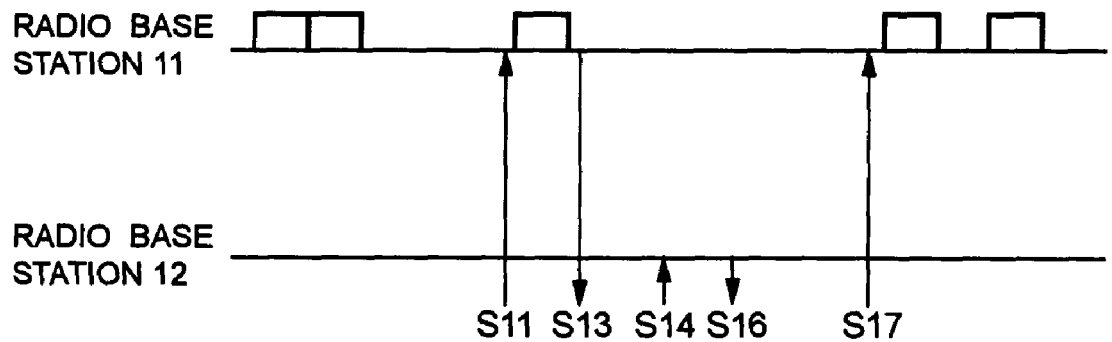

Next, the operation performed when a handover fails will be described with reference to drawings. FIG. 4 is a sequence diagram showing the operation for when a handover fails in the mobile communication system of FIG. 1, and FIG. 5B shows the user data transmission operation at the radio base stations of FIG. 1 when a handover fails. As processing from step S11 to S15 of FIG. 4 is similar to those at steps S1 to S5 of FIG. 3, description of them is omitted.

In FIG. 4, if the control unit 106 of the destination radio base station 12 determines that the base station 12 cannot accommodate the mobile terminal 1 (step S15), it transmits to the mobile terminal 1 a data transmission response indicating that the mobile terminal 1 cannot be accommodated (step S16). Upon receipt of the data transmission response, the mobile terminal 1 transmits a handover failure notice to the source radio base station 11 (step S17). At the source radio base station 11, in response to the handover failure notice from the mobile terminal 1, the scheduling unit 104 performs scheduling so that interrupted transmission of user data using a shared channel to the mobile terminal 1 will be resumed. Then, as shown in FIG. 5B, the control unit 106 starts transmission of user data destined for the mobile terminal 1 accumulated in the buffer 105 in accordance with the scheduling result (step S18), and waits for the next handover implementation request from the mobile terminal 1 (step S19).

After step S17, the source radio base station 11, which is to resume data transmission, may give higher priority to data transmission to the mobile terminal 1 than that to other mobile terminals based on the amount of data accumulated in the buffer 105 and/or the QoS required by the mobile terminal 1.

As has been thus far described, in the first exemplary embodiment of the invention, since the destination radio base station 12 starts transmission of user data destined for the mobile terminal 1 that has been accumulated in its buffer 105 during the handover of the mobile terminal 1 in response to the completion of the handover, the mobile terminal 1 can perform a handover without causing packet loss.

Also, in the first exemplary embodiment of the invention, since the source radio base station 11 interrupts data transmission to the mobile terminal 1 during the handover of the mobile terminal 1, even if the handover of the mobile terminal 1 fails, packet loss can be prevented by resuming data transmission from the source radio base station 11.

In addition, the first exemplary embodiment of the invention can prevent decrease in the data transmission rate because the destination radio base station 12 gives higher priority to data transmission to the mobile terminal 1 than that to other mobile terminals by making reference to the amount of data accumulated in the buffer or QoS.

Further, the first exemplary embodiment of the invention can simplify and speed up the procedure of a handover because it performs a handover which is led by the mobile terminal 1 by transmitting a data transmission request directly to the destination radio base station 12.

Figure 6:
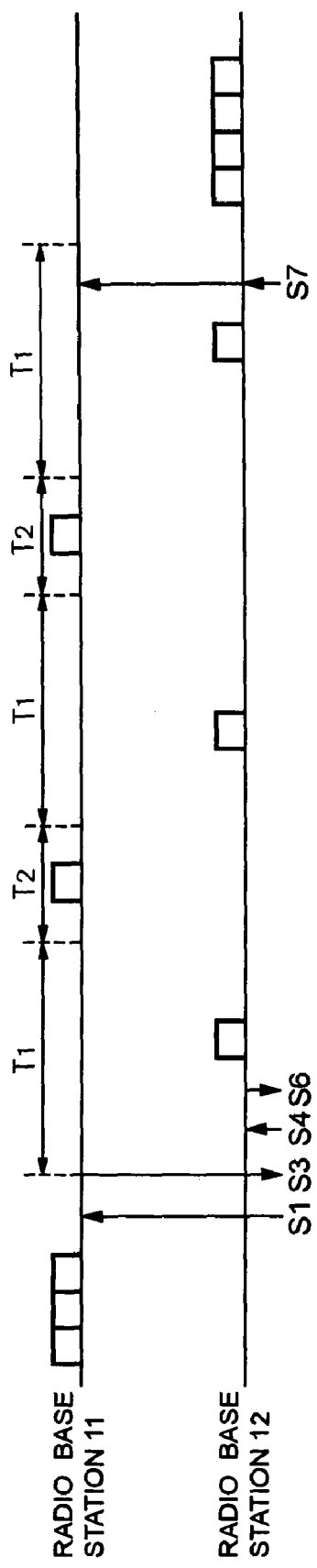
FIG. 6 shows the user data transmission operation of the radio base stations of FIG. 1 during a handover according to a second exemplary embodiment of the invention.

In the following, a second exemplary embodiment of the invention will be described with reference to drawings. A mobile communication system according to the second exemplary embodiment of the invention has a similar configuration to that of the mobile communication system according to the first exemplary embodiment of the invention shown in FIG. 1, and the configuration of the radio base stations is similar to the one shown in FIG. 2. However, the user data transmission operation at radio base stations during a handover is different from the operation shown in FIG. 5. FIG. 6 shows the operation for user data transmission at the radio base stations of FIG. 1 during a handover according to the second exemplary embodiment of the invention.

The operation of the mobile communication system according to the second exemplary embodiment of the invention will be described below with reference to FIGS. 1 to 3 and FIG. 6. In FIG. 3, the mobile terminal 1 receives a pilot signal transmitted from each cell, decides a destination cell based on the magnitude of propagation loss or the reception quality of the signal, and makes a handover implementation request to the source radio base station 11 (step S1).

At the source radio base station 11, as shown in FIG. 6, in response to the handover implementation request from the mobile terminal 1, the scheduling unit 104 sets an interruption period T1 in which transmission of user data using a shared channel to the mobile terminal 1 is interrupted and a transmission period T2 in which the transmission is performed (step S2). As shown in FIG. 6, the interruption period T1 and the transmission period T2 are alternately set during a handover in the source radio base station 11, and user data transmission from the source radio base station 11 to the mobile terminal 1 using a shared channel is performed only in the transmission period T2 in accordance with a scheduling result from the scheduling unit 104. The periods T1 and T2 are values given to the radio base station 11 in advance as station data.

Then, the control unit 106 transmits a handover implementation response to the mobile terminal 1 via the antenna 101 and the wireless communication unit 102 (step S3). Here, the control unit 106 also notifies the mobile terminal 1 of information on the interruption period T1 and transmission period T2. Upon receipt of the handover implementation response from the source radio base station 11, the mobile terminal 1 transmits a data transmission request to the radio base station 12 which manages the destination cell (step S4). Here, in order to specify the requested destination of data transmission, the mobile terminal 1 also notifies the destination radio base station 12 of a cell identification number as well as information on the interruption period T1 and the transmission period T2 of the source radio base station 11.

Upon receiving the data transmission request, the control unit 106 of the destination radio base station 12 checks available radio resources and determines whether the base station 12 can accommodate the mobile terminal 1 or not (step S5). If the mobile terminal 1 can be accommodated, the control unit 106 starts to accumulate user data destined for the mobile terminal 1 which is received from the core network 20 in the buffer 105, and transmits to the mobile terminal 1 a data transmission response indicating that the mobile terminal 1 can be accommodated (step S6).

At the destination radio base station 12, the scheduling unit 104 performs scheduling so that user data transmission to the mobile terminal 1 using a shared channel is performed in the interruption period T1 of the source radio base station 11. As shown in FIG. 6, the control unit 106 starts the transmission of user data destined for the mobile terminal 1 accumulated in the buffer 105 in accordance with the result of the scheduling. Consequently, during its handover, the mobile terminal 1 can receive user data that is transmitted using a shared channel from the source radio base station 11 in the transmission period T2 of the source radio base station 11 while receiving user data that is transmitted using a shared channel from the destination radio base station 12 in the interruption period T1 of the source radio base station 11.

After receiving the data transmission response from the destination radio base station 12, the mobile terminal 1 receives a control signal from the destination radio base station 12 to complete the handover, and then transmits a handover completion notice to the source and destination radio base stations 11 and 12 (step S7). As shown in FIG. 6, upon receipt of the notice, the source radio base station 11 terminates the user data transmission to the mobile terminal 1 using a shared channel. On the other hand, at the destination radio base station 12, the scheduling unit 104 decides the order of transmitting user data to the mobile terminal 1 using a shared channel in accordance with a normal scheduling, instead of a scheduling that takes into consideration the interruption period T1 and the transmission period T2 of the source radio base station 11, and the control unit 106 transmits user data destined for the mobile terminal 1 which is accumulated in the buffer 105 in accordance with the scheduling result.

In the data transmission from the destination radio base station 12 after step S7 in the second exemplary embodiment of the invention, the scheduling unit 104 may give higher priority to data transmission to the mobile terminal 1 than that to other mobile terminals based on the amount of data accumulated in the buffer 105 and/or the QoS required by the mobile terminal 1.

Also, although the interruption period T1 and the transmission period T2 at the source radio base station 11 are fixed values that are given in advance as station data in the second exemplary embodiment of the invention, the source radio base station 11 may monitor the frequency of handover occurrence in a cell which it covers, and the control unit 106 of the source radio base station 11 may change the length of interruption period T1 based on the frequency of handover occurrence and notify the scheduling unit 104 of the length. Specifically, the control unit 106 sets a large interruption period T1 when the frequency of handover occurrence is high.

As has been thus far described, in the second exemplary embodiment of the invention, the interruption period T1 and the transmission period T2 are alternately set during a handover at the source radio base station 11, and the destination radio base station 12 transmits user data during the interruption period T1 and the source radio base station 11 transmits user data during the transmission period T2. Consequently, the mobile terminal 1 can receive user data from the source radio base station 11 in the transmission period T2 while receiving user data from the destination radio base station 12 in the interruption period T1 during its handover, which thereby can prevent occurrence of data loss at the time of the handover.

Also, as stated above, in the second exemplary embodiment of the invention, the destination radio base station 12 transmits user data in the interruption period T1 and the source radio base station 11 transmits user data in the transmission period T2 during a handover. Therefore, reduction in the data transmission rate can be prevented compared to a case where data transmission to the mobile terminal 1 is interrupted during a handover.

The processing operations of each of the radio base stations and mobile terminals in accordance with the sequence diagrams shown in FIGS. 3 and 4 can be realized by having a computer which serves as a CPU (or a control unit) reading and executing a program prestored in a storage medium such as ROM.

An exemplary advantage according to the invention is that occurrence of data loss can be prevented during a handover using a shared channel.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication system, comprising:
   a mobile station;
   base stations; and
   a core network that transmits data destined for the mobile station to at least both a handover source base station and a handover destination base station among the base stations at a time of a handover of the mobile station, the handover source base station transmitting the data to the mobile station using a shared channel,
   wherein during the handover of the mobile station, the handover source base station alternately sets an interruption period in which transmission of the data to the mobile station using the shared channel is interrupted and a period in which the transmission is performed,
   wherein the handover destination base station performs transmission of the data to the mobile station using the shared channel in the interruption period during the handover of the mobile station, and
   wherein a plurality of ones of the interruption period in which transmission of the data to the mobile station using the shared channel is interrupted and a plurality of ones of the period in which the transmission is performed are alternately set during the handover of the mobile station.

2. The mobile communication system according to claim 1, wherein the handover destination base station comprises a buffer for accumulating the data received from the core network during the handover of the mobile station, and performs the transmission of the data to the mobile station using the shared channel giving thereto a higher priority than transmission to other mobile stations if an amount of the data accumulated in the buffer exceeds a predetermined value when the handover of the mobile station completes.

3. The mobile communication system according to claim 1, further comprising a scheduling unit,
wherein the handover source base station transmits the data to the mobile station using the shared channel only in the period in which the transmission is performed in accordance with a scheduling result from the scheduling unit.

4. The mobile communication system according to claim 1, wherein a value of the interruption period in which transmission of the data to the mobile station using the shared channel is interrupted and a value of the period in which the transmission is performed are given to the handover source base station in advance as station data.

5. The mobile communication system according to claim 1, wherein the mobile station notifies the handover destination base station of a cell identification number and information on the interruption period in which transmission of the data to the mobile station using the shared channel is interrupted and the period in which the transmission is performed.

6. The mobile communication system according to claim 1, further comprising a scheduling unit;
wherein at the handover destination base station the scheduling unit performs a scheduling so that user data transmission to the mobile station is performed in the interruption period in which transmission of the data to the mobile station using the shared channel is interrupted.

7. The mobile communication system according to claim 1, wherein the handover source base station monitors a frequency of the handover of the mobile station, and
wherein a length of the interruption period in which transmission of the data to the mobile station using the shared channel is interrupted is changed based on the frequency of handover of the mobile station.

8. The mobile communication, system according to claim 7, wherein the length of the interruption period in which transmission of the data to the mobile station using the shared channel is interrupted is increased when the frequency of handover of the mobile station in increased.

9. The mobile communication system according to claim 1, wherein the handover source radio base station transmits user data during the period in which the transmission is performed.

10. The mobile communication system according to claim 1, wherein the mobile station receives user data from the handover source base station in the period in which the transmission is performed, and receives the user data from the handover destination base station in the interruption period in which transmission of the data to the mobile station using the shared channel is interrupted.

11. The mobile communication systems according to claim 1, wherein the handover of the mobile station is performed by transmitting a data transmission request directly from the mobile station to the handover destination base station.

12. A handover control method for a mobile communication system that comprises a mobile station, base stations, and a core network that transmits data destined for the mobile station to at least both a handover source base station and a handover destination base station among the base stations at a time of a handover of the mobile station, the handover source base station transmitting the data to the mobile station using a shared channel, the method comprising:
during the handover of the mobile station, alternately setting an interruption period in which transmission of the data from the handover source base station to the mobile station using the shared channel is interrupted and a period in which the transmission is performed; and
performing transmission of the data from the handover destination base station to the mobile station using the shared channel in the interruption period during the handover of the mobile station,
wherein a plurality of ones of the interruption period in which transmission of the data from the handover source base station to the mobile station using the shared channel is interrupted and a plurality of ones of the period in which the transmission is performed are alternately set during the handover of the mobile station.

13. The handover control method according to claim 12, wherein the handover destination base station performs the transmission of the data to the mobile station using the shared channel giving thereto a higher priority than transmission to other mobile stations if an amount of the data accumulated in a buffer for accumulating the data received from the core network during the handover of the mobile station exceeds a predetermined value when the handover of the mobile station completes.

14. A base station in a mobile communication system that comprises a mobile station, base stations, and a core network that transmits data destined for the mobile station to at least both a handover source base station and a handover destination base station among the base stations at a time of a handover of a mobile station, the handover source base station transmitting the data to the mobile station using a shared channel,
wherein the base station alternately sets an interruption period in which transmission of the data to the mobile station using the shared channel is interrupted and a period in which a transmission is performed during the handover of the mobile station from the base station to another base station,
wherein the base station performs, during the handover of the mobile station thereto, transmission of the data to the mobile station using the shared channel in the interruption period set in the another base station, and
wherein a plurality of ones of the interruption period in which transmission of the data to the mobile station using the shared channel is interrupted and a plurality of ones of the period in which the transmission is performed are alternately set during in the handover of the mobile station.

15. The base station according to claim 14, wherein the base station comprises a buffer for accumulating the data received from the core network during the handover of the mobile station to the base station, and performs transmission of the data to the mobile station using the shared channel giving thereto a higher priority than transmission to other mobile stations if an amount of the data accumulated in the buffer exceeds a predetermined value when the handover of the mobile station completes.

16. A recording medium having recorded thereon a program for causing a computer to execute an operation control method for a base station in a mobile communication system that comprises a mobile station, base stations, and a core network that transmits data destined for the mobile station to at least both a handover source base station and a handover destination base station among the base stations at a time of a handover of the mobile station, the handover source base station transmitting the data to the mobile station using a shared channel, wherein the program comprises:
processing of, during the handover of the mobile station from the base station to another base station, alternately setting an interruption period in which the transmission of the data to the mobile station using the shared channel is interrupted and a period in which the transmission is performed; and processing of, during the handover of the mobile station from another base station to the base station, performing the transmission of the data to the mobile station using the shared channel in the interruption period set in the another base station, wherein a plurality of ones of the interruption period in which transmission of the data to the mobile station using the shared channel is interrupted and a plurality of ones of the period in which the transmission is performed are alternately set during the handover of the mobile station.

17. A mobile station in a mobile communication system that comprises the mobile station, base stations, and a core network that transmits data destined for the mobile station to at least both a handover source base station and a handover destination base station among the base stations at a time of a handover of the mobile station, the handover source base station transmitting the data to the mobile station using a shared channel, wherein the mobile station receives, during the handover thereof, the data from the handover source base station which alternately sets an interruption period in which transmission of the data to the mobile station using the shared channel is interrupted and a transmission period in which the transmission is performed, in the transmission period, and receives, during the handover thereof, in the interruption period of the data from the handover destination base station that performs the transmission of the data to the mobile stating using the shared channel in the interruption period, and wherein a plurality of ones of the transmission period in which transmission of the data to the mobile station using the shared channel is interrupted and a plurality of ones of the period in which the transmission is performed are alternately set during the handover.

18. A recording medium having recorded thereon a program for causing a computer to execute an operation control method for a mobile station in a mobile communication system that comprises a mobile station, base stations, and a core network that transmits data, destined for the mobile station to at least both a handover source base station and a handover destination base station among the base stations at a time of a handover of the mobile station, the handover source base station transmitting the data to the mobile station using a shared channel, wherein the program comprises:

processing of receiving, during the handover of the mobile station, the data from the handover source base station which alternately sets an interruption period which transmission of the data to the mobile station using the shared channel is interrupted and a transmission period in which the transmission is performed, in the transmission period; and receiving, during the handover of the mobile station, in the interruption period the data from the handover destination base station that performs the transmission of the data to the mobile station using the shared channel in the interruption period, wherein a plurality of ones of the interruption period in which transmission of the data to the mobile station using the shared channel is interrupted and a plurality of ones of the transmission period in which the transmission is performed are alternately set during the handover of the mobile station.

* * * * *